United States Patent

[11] 3,584,831

| [72] | Inventor | Carl Heinz Hafele<br>Monchengladbach, Germany |
|---|---|---|
| [21] | Appl. No. | 801,605 |
| [22] | Filed | Feb. 24, 1969 |
| [45] | Patented | June 15, 1971 |
| [73] | Assignee | Rheinische Armaturen-u, Maschinenfabrik<br>Albert Sempell<br>Lurriper Strasse, Monchengladbach,<br>Germany |
| [32] | Priority | Feb. 24, 1968 |
| [33] | | Germany |
| [31] | | P 16 75 517.2 |

[54] COCK WITH ELASTIC LINING
7 Claims, 7 Drawing Figs.

[52] U.S. Cl. ............................................... 251/172
[51] Int. Cl. ............................................... F16k 5/18
[50] Field of Search ............................................ 251/172,
175, 173, 317

[56] References Cited
UNITED STATES PATENTS

| 1,868,147 | 7/1932 | Kruse | 251/172 |
| 2,943,838 | 7/1960 | Skei | 251/172 X |
| 3,216,695 | 11/1965 | Bartholet | 251/173 |
| 3,387,817 | 6/1968 | Seguenot | 251/317 |
| 3,475,004 | 10/1969 | Jennings | 251/172 X |

FOREIGN PATENTS

| 1,190,771 | 4/1959 | France | 251/175 |
| 1,024,301 | 2/1958 | Germany | 251/317 |
| 602,872 | 3/1960 | Italy | 251/175 |

Primary Examiner—M. Cary Nelson
Assistant Examiner—Michael O. Sturm
Attorney—Walter Becker ABSTRACT: A valve structure having a lining of elastically deformable material between the sealing surfaces of the plug and the housing in which the lining at least partially defines chamber means within the lining adapted to be conveyed with pressure fluid while the end faces of said lining are supported by fixedly arranged supporting walls.

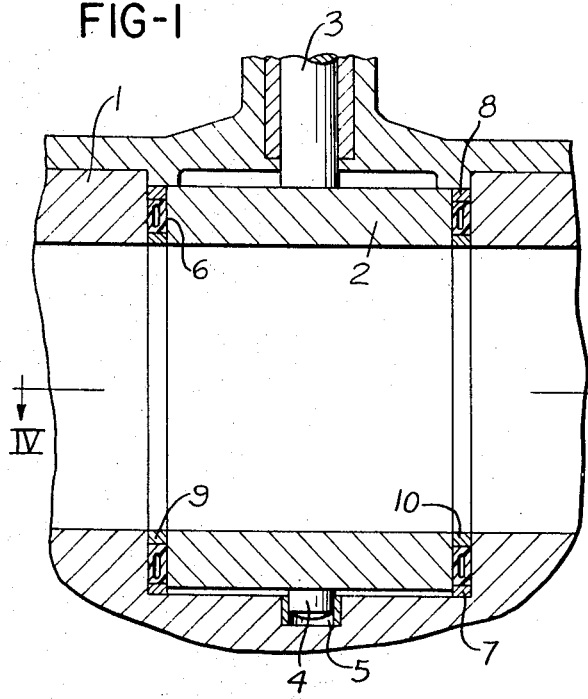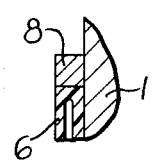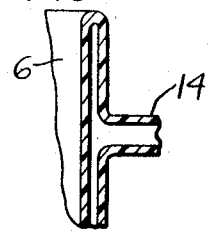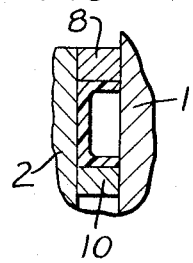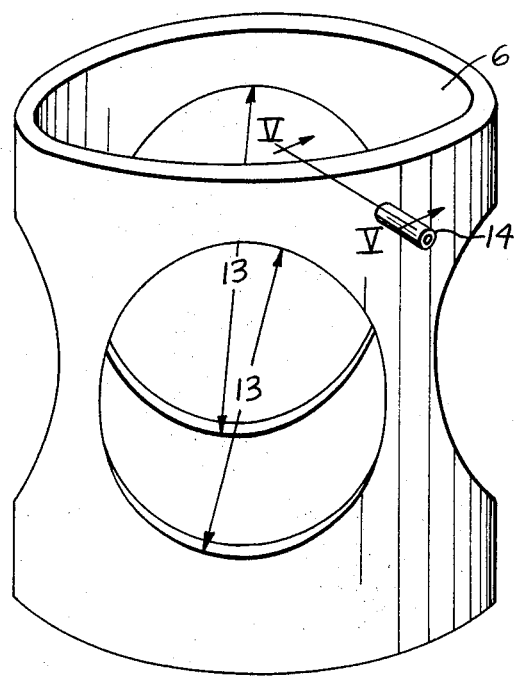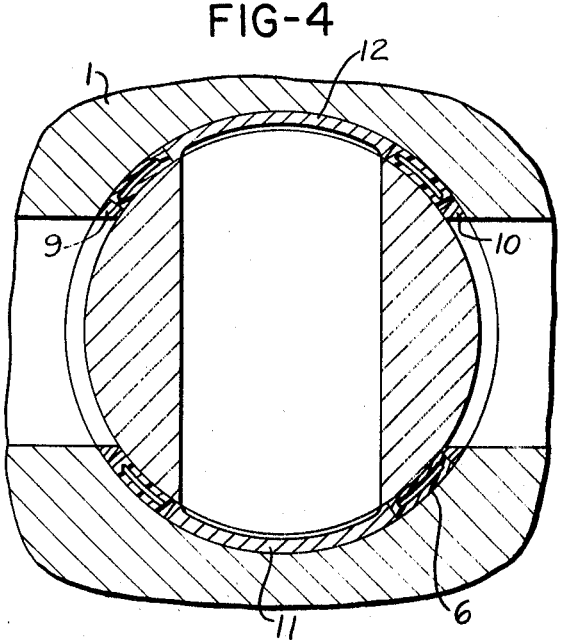

COCK WITH ELASTIC LINING

The present invention relates to a cock or valve for shutting off gases and liquids according to which between the sealing surfaces of the plug and the housing there is provided a lining of an elastically deformable material.

It is known with a cock valve between the plug and the bore in the housing in which the plug is journaled to provide a lining of synthetic material, rubber or other substances, in order to thereby improve the seal or to obtain a grater corrosion resistance. The proper sealing, when using such linings, requires that the lining is sufficiently elastic and retains its elasticity over a longer period of time. This requirement, however, is hard to meet in many instances.

It is, therefore, an object of the present invention to design an elastic lining for a cock which will assure that the lining will constantly and in a highly satisfactory manner be pressed against the sealing surfaces and that the pressing force can be varied.

This object and other objects and advantages of the invention will appear more clearly from the following specification, in connection with the accompanying drawing, in which:

FIG. 1 diagrammatically illustrates a longitudinal section through a cylindrical cock valve with a double-walled lining.

FIG. 2 is a cutout of FIG. 1 on a scale considerably larger than that of FIG. 1.

FIG. 3 is a perspective view of the double-walled lining.

FIG. 4 is a section taken along the line IV–IV of FIG. 1.

FIG. 5 is a section along the line V–V of FIG. 3.

FIG. 6 shows a modified lining which differs from the lining of FIGS. 1–5 in that it has only one wall and forms the fluid receiving chamber together with a wall portion of the housing of the valve.

FIG. 7 shows a lining with a double chamber.

The present invention is characterized primarily in that the lining is double walled and between the walls comprises a closed chamber for receiving a pressure fluid adapted to be conveyed to said chamber by an outwardly leading conduit, the narrow sides of said chamber resting against supporting walls.

The chamber for receiving a pressure fluid means may in the closing position as well as in the open position of the plug be filled with a hydraulic or pneumatic pressure fluid so that a complete seal will be realized. During the actuation of the plug, the pressure is advantageously relieved or reduced while a suitable device will prevent the said chamber from being exposed to pressure when the plug is in its intermediate position. For producing the required pressure, a separate unit may be employed or the fluid in the conduit containing the cock valve may be used.

When, for instance, using the pressure fluid from a conduit with pressure which alternately acts on one side and the opposite side, and when it is intended to present a flow from one side of the cock to the other side, the present invention suggests to design the lining with three walls and to provide two separate closed chambers between the walls for receiving the pressure fluid.

According to a further development of the invention, only the inner or the outer wall of the lining may consist of an elastically deformable material. Furthermore, according to the invention, the lining may be arranged stationarily in the housing of the cock valve or may be arranged stationarily on the mantle of the plug.

According to a further feature of the invention, supporting walls, for instance, in the form of rings are provided at the end faces and the passages of the lining. The supporting walls, for instance, in the form of rings may be connected either in the housing of the cock or on the mantle of the plug. For additionally supporting the lining, the lining may, in one direction approximately perpendicular to the axis of the through-flow bore, be provided at both sides with openings which are filled in by supports, for instance, in the form of discs.

When the lining is arranged on the plug, the supply of pressure fluid is effected through a bore in the spindle of the plug.

Referring now to the drawing in detail, the housing 1 of the cock valve has arranged therein a cylindrical plug 2 which can be rotated about its axis by means of a spindle 3. The bottom side of plug 2 is provided with a stud or pivot 4 which is rotatably journaled in a bore 5 of the housing. However, if desired, the stud or pivot 4 may be omitted and the plug may be journaled directly in the housing. Between the plug and the wall of the bore in housing 1, there is provided the lining 6 according to the present invention, which in conformity with one embodiment of the invention is a double-walled lining shown particularly clearly in FIG. 3.

For purposes of supporting the lining, rings 7 and 8 are arranged at the end faces of the lining. These rings are secured in the bore of the housing against displacement in any standard manner. Further supports for the lining are provided in the form of rings 9, 10 at the through-flow bores. These rings 9, 10 surround the said through-flow bores in he housing 1 in the manner of a ring and are firmly connected to the housing in any convenient manner. Furthermore, the lining is additionally supported at two areas in the housing wall which are located approximately perpendicular to the axis of the through-flow bores of the housing. At these areas, discs 11, 12 (FIG. 4) are connected to the inner wall of the bores. These discs 11, 12 fill in the corresponding recesses 13 in the cylindrical mantle of the lining 6 in a tight sealing manner.

The lining 6 is supported on all sides by the rings 7, 8 and 9, 10 and by the discs 11, 12 so that when pressure fluid is introduced into the chamber formed within the lining, the lining cannot escape. The pressure prevailing in the pressure chamber of the lining is conveyed to the supporting walls and also to the sealing surfaces on the plug 2 and the inner wall of the housing 1. With the embodiment shown in the drawing, it is assumed that the lining is stationarily arranged in the housing 1. The feeding line for the pressure fluid is designated with the reference numeral 14 and is shown in FIGS. 3 and 5.

Instead of the circular cutouts 13 (FIG. 3), also cutouts of other geometrical configuration maybe employed.

The lining which in FIGS. 1, 4, and 5 is shown as a double-walled lining may instead also be designed as a lining 6a (FIG. 6) having a single elastic wall only. In this instance, the wall housing serves as second wall and is connected to the elastic wall in a proper manner to resist the pressure which may occur in the chamber formed by the elastic wall of the lining and the said wall of the housing. If desired, the lining according to the invention may also be designed in conformity with FIG. 7, according to which the lining comprises a partition 6b which with the remaining portion of the lining forms two chambers 6c and 6d. The partition 6b, in the open position of the plug, extends approximately perpendicularly with regard to the through-flow direction.

With a lining having two separate closed pressure fluid receiving chambers as shown in FIG. 7, the design of the lining with regard to the outer shape and the arrangement of the lining in the cock is effected in the same manner as with the lining of FIG. 1.

As will be evident from the above, the advantage inherent to the lining according to the present invention consists primarily in that the pressure at which the lining is pressed against the sealing surfaces can be varied independently of the elasticity of the material of which the lining is made and can be adapted to the corresponding prevailing conditions. The lining itself may consist of rubber material or any synthetic materials used in connection with the sealing of valves or the like.

It is to be understood that the present invention is not limited to the particular showing in the drawing, but also comprises any modifications within the scope of the appended claims. Thus, the lining according to the invention may also be used in connection with a conical cock or a ball cock.

What I claim is:

1. A plug-type valve structure comprising a housing and a plug and a lining of elastically deformable material which is interposed between said housing and said plug for sealingly engaging the same, said lining at least partially defining chamber means located within said lining and having means for selective connection of said chamber means to a source of pressure fluid, supporting means engaging and supporting surfaces of said lining other then those engaged by said plug and said housing, said lining defining a through-flow bore and being provided at opposite sides with openings, and plate means arranged within said openings and closing the same.

2. A plug-type valve structure according to claim 1, in which said lining defines two closed separate chamber forming means, each of said chamber means being provided with means for connection to a source of pressure fluid.

3. A plug-type valve structure according to claim 1, in which the partial chamber means defined by said lining is supplemented by a portion of said housing.

4. A plug-type valve structure according to claim 1, in which said lining is stationarily arrange in said housing.

5. A plug-type valve structure according to claim 1, in which said lining is firmly connected to the plug.

6. A plug-type structure according to claim 1, in which said supporting means is arranged at and in engagement with said lining.

7. A plug-type valve structure according to claim 6, in which said supporting means are formed by rings.